US011064678B1

(12) United States Patent
Persinger

(10) Patent No.: US 11,064,678 B1
(45) Date of Patent: Jul. 20, 2021

(54) ELECTRONIC FENCE ALERT ASSEMBLY

(71) Applicant: Ben Persinger, Moscow, KS (US)

(72) Inventor: Ben Persinger, Moscow, KS (US)

( * ) Notice: Subject to any disclaimer, the term of this patent is extended or adjusted under 35 U.S.C. 154(b) by 0 days.

(21) Appl. No.: 16/823,480

(22) Filed: Mar. 19, 2020

(51) Int. Cl.
*A01K 3/00* (2006.01)
*G08B 25/10* (2006.01)
*G08B 21/18* (2006.01)
*G08B 13/12* (2006.01)

(52) U.S. Cl.
CPC ............ *A01K 3/005* (2013.01); *G08B 13/122* (2013.01); *G08B 21/182* (2013.01); *G08B 25/10* (2013.01)

(58) Field of Classification Search
CPC ...... A01K 3/005; G08B 13/122; G08B 25/10; G08B 21/182
See application file for complete search history.

(56) References Cited

U.S. PATENT DOCUMENTS 4,220,949 A * 9/1980 Pope .................... G08B 13/122 256/10
4,297,633 A * 10/1981 McCutchan ......... G08B 13/122 324/500
5,302,945 A * 4/1994 Stoltenberg ............ A01K 3/005 340/660
5,550,530 A * 8/1996 Hamm ..................... H05C 3/00 256/10
5,767,592 A * 6/1998 Boys ........................ H03K 3/57 256/10
5,982,291 A * 11/1999 Williams ............. G08B 13/122 256/10
9,658,257 B1 * 5/2017 Lunger .................. G08B 25/10
10,254,328 B1 * 4/2019 Lowe ..................... G01R 31/58
2002/0033756 A1 * 3/2002 Hamm ..................... H05C 3/00 340/564
2008/0186172 A1 * 8/2008 Thompson ............. G08B 13/26 340/541
2012/0133377 A1 * 5/2012 Shan .................. G08B 13/2497 324/713
2014/0014403 A1 * 1/2014 Miller .................. H05K 1/0281 174/260
2019/0053362 A1 * 2/2019 Hamm ..................... H05C 3/00

FOREIGN PATENT DOCUMENTS

WO WO2009028966 3/2009

* cited by examiner

*Primary Examiner* — Ojiako K Nwugo

(57) ABSTRACT

An electric fence alert assembly includes a control box that is mountable to a fence post of an electric fence. The control box is place in electrical communication with a power supply of the electric fence, a respective one of a ground rod of the electric fence and a fence wire of the electric fence. A signal analyzer is positioned within the control box and the signal analyzer is in electrical communication with the electric fence. A transceiver is positioned within the control box and the transceiver is in wireless communication with a personal electronic device. Moreover, the transceiver broadcasts an alert signal to the personal electronic device when the signal analyzer determines that a fault has occurred in the electric fence to alert a user that the fault has occurred.

7 Claims, 3 Drawing Sheets

ELECTRONIC FENCE ALERT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to alert devices and more particularly pertains to a new alert device for alerting a user to a fault in an electric fence.

(2) Description of Related Art Including Information Disclosed Under 37 CFR 1.97 and 1.98

The prior art relates to alert devices. The prior art discloses an electric fence alert device that includes a plurality of proximally located audible alerts. Additionally, the prior art discloses an electric fence alert that includes a receiver for receiving an alert signal and an audible alarm. Additionally, the prior art discloses a variety of electric fence alerts that include an electrical communication with a telephone landline for communicating an alert to a remote user. The prior art discloses an electric fence alert device that includes wireless communication with a personal electronic device and a logic tree for determining a level of alert as well as automatically turning the electric fence off under predetermined conditions.

BRIEF SUMMARY OF THE INVENTION

An embodiment of the disclosure meets the needs presented above by generally comprising a control box that is mountable to a fence post of an electric fence. The control box is place in electrical communication with a power supply of the electric fence, a respective one of a ground rod of the electric fence and a fence wire of the electric fence. A signal analyzer is positioned within the control box and the signal analyzer is in electrical communication with the electric fence. A transceiver is positioned within the control box and the transceiver is in wireless communication with a personal electronic device. Moreover, the transceiver broadcasts an alert signal to the personal electronic device when the signal analyzer determines that a fault has occurred in the electric fence to alert a user that the fault has occurred.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
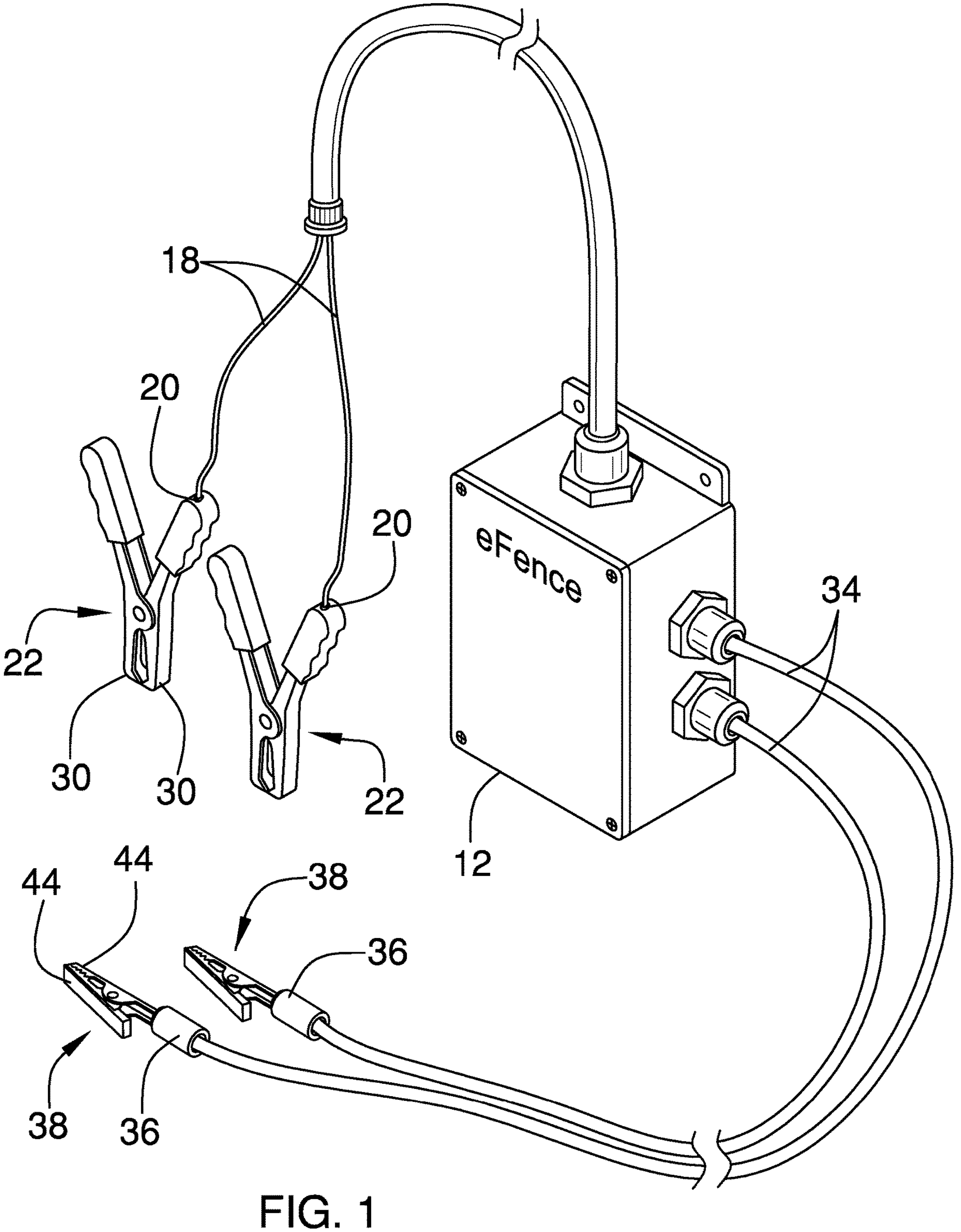
FIG. 1 is a perspective view of an electric fence alert assembly according to an embodiment of the disclosure.
Figure 2:
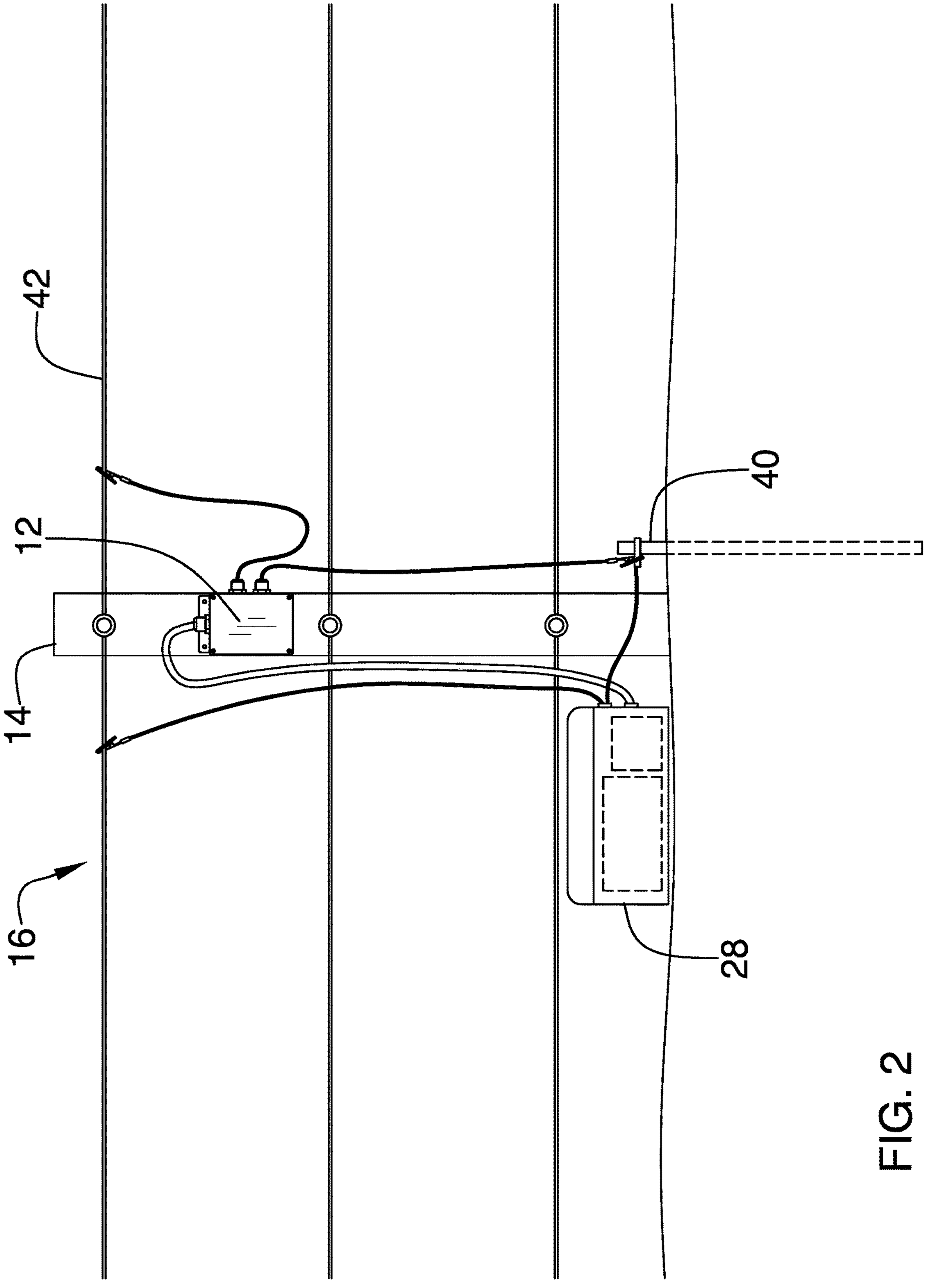
FIG. 2 is a perspective in-use view of an embodiment of the disclosure.
Figure 3:
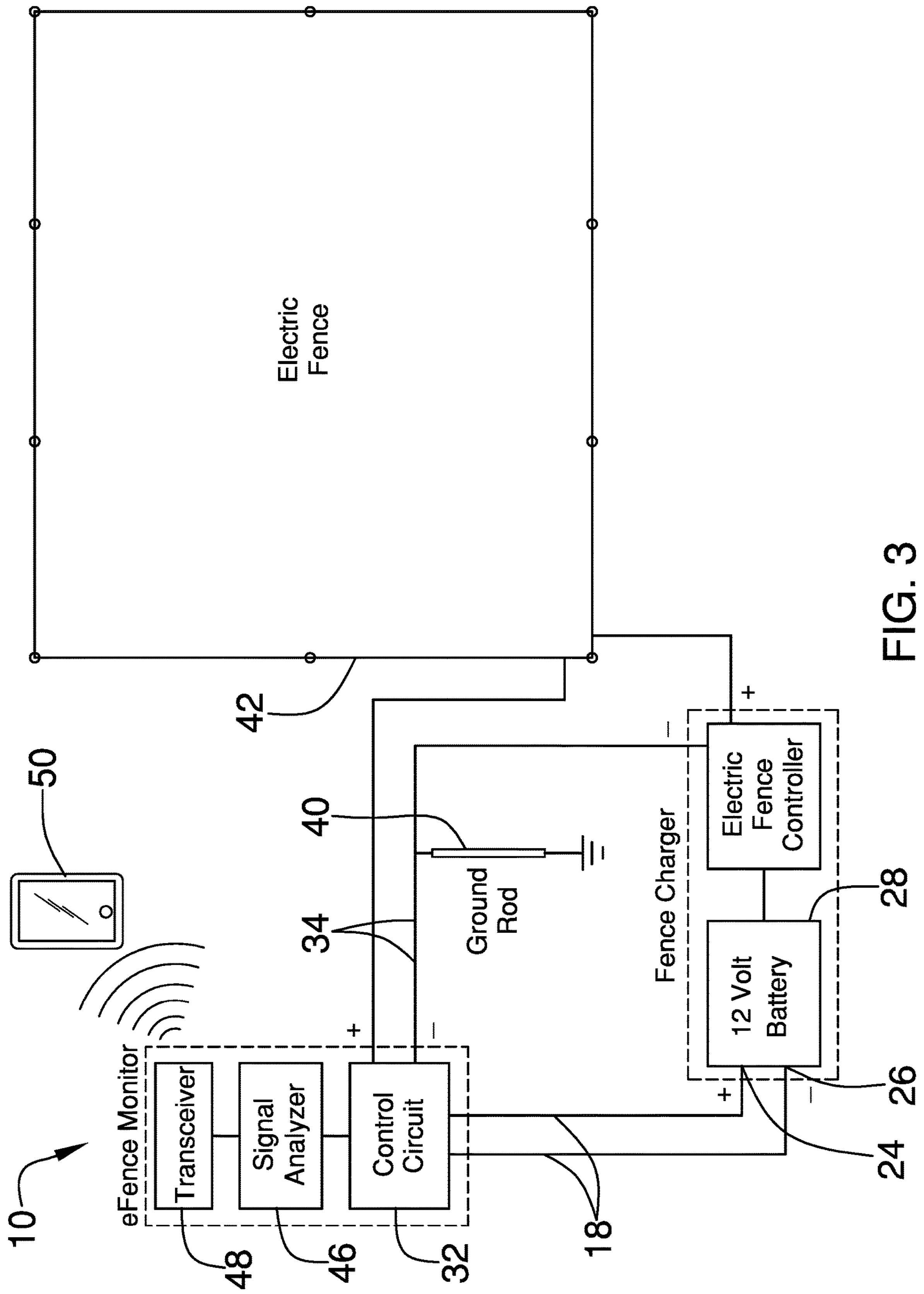
FIG. 3 is a schematic view of an embodiment of the disclosure.

With reference now to the drawings, and in particular to FIGS. 1 through 3 thereof, a new alert device embodying the principles and concepts of an embodiment of the disclosure and generally designated by the reference numeral 10 will be described.

As best illustrated in FIGS. 1 through 3, the electric fence alert assembly 10 generally comprises a control box 12 that is mountable to a fence post 14 of an electric fence 16. The electric fence 16 may surround a livestock pen, a pasture or any other type of area commonly employed for raising livestock. A pair of battery cables 18 is provided, each of the battery cables 18 is coupled to and extends away from the control box 12, and each of the battery cables 18 has a distal end 20 with respect to the control box 12.

A pair of battery clamps 22 is each electrically coupled to a respective one of the battery cables 18. Each of the battery clamps 22 is clamped to a respective one of a positive terminal 24 and a negative terminal 26 of a power supply 28 for the electric fence 16. Each of the battery clamps 22 comprises a pair of jaws 30 that are biased together for releasably engaging the respective positive terminal 24 and negative terminal 26. Each of the battery clamps 22 is comprised of an electrically conductive material for placing each of the battery clamps 22 in electrical communication with the power supply 28.

A control circuit 32 is positioned within the control box 12 and the control circuit 32 receives a fault input. Each of the battery cables 18 is electrically coupled to the control circuit 32 for receiving electrical power from the power supply 28. A pair of sensing cables 34 is each coupled to and extends away from the control box 12. Each of the sensing cables 34 has a distal end 36 with respect to the control box 12 and each of the sensing cables 34 is electrically coupled to the control circuit 32.

A pair of sensing clamps 38 is each electrically coupled to the distal end of a respective one of the sensing cables 34. Each of the sensing clamps 38 is clamped to a respective one of a ground rod 40 of the electric fence 16 and a fence wire 42 of the electric fence 16. In this way the pair of sensing cables 34 completes a circuit between the electric fence 16 and the control box 12. Each of the sensing clamps 38 comprises a pair of jaws 44 that are biased together for releasably engaging the respective ground rod 40 or fence wire 42. Each of the sensing clamps 38 is comprised of an electrically conductive material.

A signal analyzer 46 is provided and the signal analyzer 46 is positioned within the control box 12. The signal analyzer 46 is in electrical communication with the sensing clamps 38. Moreover, the signal analyzer 46 is electrically coupled to the control circuit 32 to analyze the electrical current in the fence wire 42. The control circuit 32 receives the fault input when the signal analyzer 46 determines that the electric fence 16 has ceased to normally operate. The signal analyzer 46 may monitor the duration of time between pulses of electrical current in the fence wire 42, or monitor the amount of voltage or current sensed in the fence wire 42, or monitor any other operational parameters commonly associated with electric fences.

A transceiver 48 is positioned within the control box 12 and the transceiver 48 is in wireless communication with a personal electronic device 50, such as a smart phone or the like. The transceiver 48 broadcasts an alert signal to the personal electronic device 50 when the signal analyzer 46 determines that a fault has occurred in the electric fence 16. In this way the transceiver 48 alerts a user that the fault has occurred. Thus, the user can immediately respond to the fault and potentially prevent livestock from escaping the livestock pen. The transceiver 48 is electrically coupled to the control circuit 32 and the transceiver 48 may comprise a radio frequency transceiver or the like. Moreover, the transceiver 48 may be in wireless communication with a cellular phone communication network thereby facilitating the transceiver 48 to communicate with the personal electronic device 50 at any distance.

In use, the control box 12 is mounted to the fence post 14, or other preferred location, and each of the battery cables 18 is connected to the power supply 28. Each of the sensing cables 34 is connected to the respective ground rod 40 and the fence wire 42. In this way the signal analyzer 46 can monitor the performance of the fence wire 42 with respect to electrical current and voltage. The control circuit 32 receives the fault input when the signal analyzer 46 detects a fault and the transceiver 48 broadcasts the alert signal to the personal electronic device 50. In this way the user is immediately notified of the problem to facilitate the user to rapidly respond.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric fence alert assembly for monitoring functioning of an electric fence and sending an alert to a user when a fault occurs in the electric fence, said assembly comprising:

a control box being mountable to a fence post of an electric fence;

a pair of battery cables, each of said battery cables being coupled to and extending away from said control box;

a pair of battery clamps, each of said battery clamps being electrically coupled to a respective one of said battery cables, each of said battery clamps being clamped to a respective one of a positive terminal and a negative terminal of a power supply for the electric fence;

a pair of sensing cables, each of said sensing cables being coupled to and extending away from said control box, each of said sensing cables having a distal end with respect to said control box;

a pair of sensing clamps, each of said sensing clamps being electrically coupled to said distal end of a respective one of said sensing cables, each of said sensing clamps being clamped to a respective one of a ground rod of the electric fence and a fence wire of the electric fence wherein said pair of sensing cables is configured to complete a circuit between the electric fence and said control box;

a signal analyzer being positioned within said control box, said signal analyzer being in electrical communication with said sensing clamps; and a transceiver being positioned within said control box, said transceiver being in wireless communication with a personal electronic device, said transceiver broadcasting an alert signal to the personal electronic device when said signal analyzer determines that a fault has occurred in the electric fence wherein said transceiver is configured to alert a user that the fault has occurred.

2. The assembly according to claim 1, wherein each of said battery clamps comprises a pair of jaws being biased together for releasably engaging the respective positive and negative terminal, each of said battery clamps being comprised of an electrically conductive material for placing each of said battery clamps in electrical communication with the power supply.

3. The assembly according to claim 1, wherein:

said assembly includes a control circuit being positioned within said control box, said control circuit receiving a fault input;

each of said battery cables is electrically coupled to said control circuit for receiving electrical power from the power supply; and each of said sensing cables is electrically coupled to said control circuit.

4. The assembly according to claim 3, wherein said signal analyzer is electrically coupled to said control circuit wherein said signal analyzer is configured to analyze the electrical current in the fence wire; and said control circuit receiving said fault input when said signal analyzer determines that the electric fence has ceased to normally operate.

5. The assembly according to claim 1, wherein each of said sensing clamps comprises a pair of jaws being biased together for releasably engaging the respective ground rod or fence wire, each of said sensing clamps being comprised of an electrically conductive material.

6. An electric fence alert assembly for monitoring functioning of an electric fence and sending an alert to a user when a fault occurs in the electric fence, said assembly comprising:

a control box being mountable to a fence post of an electric fence;

a pair of battery cables, each of said battery cables being coupled to and extending away from said control box, each of said battery cables having a distal end with respect to said control box;

a pair of battery clamps, each of said battery clamps being electrically coupled to a respective one of said battery cables, each of said battery clamps being clamped to a respective one of a positive terminal and a negative terminal of a power supply for the electric fence, each of said battery clamps comprising a pair of jaws being biased together for releasably engaging the respective positive and negative terminal, each of said battery clamps being comprised of an electrically conductive material for placing each of said battery clamps in electrical communication with the power supply;

a control circuit being positioned within said control box, said control circuit receiving a fault input, each of said battery cables being electrically coupled to said control circuit for receiving electrical power from the power supply;

a pair of sensing cables, each of said sensing cables being coupled to and extending away from said control box, each of said sensing cables having a distal end with respect to said control box, each of said sensing cables being electrically coupled to said control circuit;

a pair of sensing clamps, each of said sensing clamps being electrically coupled to said distal end of a respective one of said sensing cables, each of said sensing clamps being clamped to a respective one of a ground rod of the electric fence and a fence wire of the electric fence wherein said pair of sensing cables is configured to complete a circuit between the electric fence and said control box, each of said sensing clamps comprising a pair of jaws being biased together for releasably engaging the respective ground rod or fence wire, each of said sensing clamps being comprised of an electrically conductive material;

a signal analyzer being positioned within said control box, said signal analyzer being in electrical communication with said sensing clamps, said signal analyzer being electrically coupled to said control circuit wherein said signal analyzer is configured to analyze the electrical current in the fence wire, said control circuit receiving said fault input when said signal analyzer determines that the electric fence has ceased to normally operate; and a transceiver being positioned within said control box, said transceiver being in wireless communication with a personal electronic device, said transceiver broadcasting an alert signal to the personal electronic device when said signal analyzer determines that a fault has occurred in the electric fence wherein said transceiver is configured to alert a user that the fault has occurred, said transceiver being electrically coupled to said control circuit.

7. An electric fence alert system for monitoring functioning of an electric fence and sending an alert to a user when a fault occurs in the electric fence, said assembly comprising:

an electric fence including a power supply, a ground rod and a fence wire;

a control box being mountable to a fence post of said electric fence;

a pair of battery cables, each of said battery cables being coupled to and extending away from said control box, each of said battery cables having a distal end with respect to said control box;

a pair of battery clamps, each of said battery clamps being electrically coupled to a respective one of said battery cables, each of said battery clamps being clamped to a respective one of a positive terminal and a negative terminal of said power supply for said electric fence, each of said battery clamps comprising a pair of jaws being biased together for releasably engaging said respective positive and negative terminal, each of said battery clamps being comprised of an electrically conductive material for placing each of said battery clamps in electrical communication with said power supply;

a control circuit being positioned within said control box, said control circuit receiving a fault input, each of said battery cables being electrically coupled to said control circuit for receiving electrical power from said power supply;

a pair of sensing cables, each of said sensing cables being coupled to and extending away from said control box, each of said sensing cables having a distal end with respect to said control box, each of said sensing cables being electrically coupled to said control circuit;

a pair of sensing clamps, each of said sensing clamps being electrically coupled to said distal end of a respective one of said sensing cables, each of said sensing clamps being clamped to a respective one of said ground rod of said electric fence and said fence wire of said electric fence to complete a circuit between said electric fence and said control box, each of said sensing clamps comprising a pair of jaws being biased together for releasably engaging said respective ground rod or said fence wire, each of said sensing clamps being comprised of an electrically conductive material;

a signal analyzer being positioned within said control box, said signal analyzer being in electrical communication with said sensing clamps, said signal analyzer being electrically coupled to said control circuit to analyze the electrical current in said fence wire, said control circuit receiving said fault input when said signal analyzer determines that said electric fence has ceased to normally operate; and a transceiver being positioned within said control box, said transceiver being in wireless communication with a personal electronic device, said transceiver broadcasting an alert signal to the personal electronic device when said signal analyzer determines that a fault has occurred in said electric fence wherein said transceiver is configured to alert a user that the fault has occurred, said transceiver being electrically coupled to said control circuit.

* * * * *